United States Patent [19]
Takeuchi et al.

[11] Patent Number: 5,543,249
[45] Date of Patent: Aug. 6, 1996

[54] AQUEOUS BLENDED ELECTRODE MATERIAL FOR USE IN ELECTROCHEMICAL CELLS AND METHOD OF MANUFACTURE

[75] Inventors: Esther S. Takeuchi, East Amherst; Michael F. Pyszczek, LeRoy, both of N.Y.

[73] Assignee: Wilson Greatbatch Ltd., Clarence, N.Y.

[21] Appl. No.: 396,665

[22] Filed: Mar. 1, 1995

[51] Int. Cl.$^6$ ............................... H01M 4/62; B22F 3/00
[52] U.S. Cl. ..................... 429/217; 29/623.5; 419/38; 419/65; 429/219; 429/224
[58] Field of Search ............... 429/212, 214–217, 429/218, 219, 221, 222, 223, 224; 29/623.1, 623.3, 623.5; 419/32, 38, 65, 66; 252/182.1

[56] References Cited

U.S. PATENT DOCUMENTS

| | | | |
|---|---|---|---|
| 3,928,067 | 12/1975 | Broadhead et al. | 136/6 |
| 3,928,070 | 12/1975 | Gunther | 136/83 |
| 4,205,432 | 6/1980 | Mrha et al. | 429/217 X |
| 4,556,618 | 12/1985 | Shia | 429/217 |
| 4,601,919 | 7/1986 | Asami et al. | 427/126.3 |
| 4,810,600 | 3/1989 | Periard et al. | 429/224 |
| 5,041,199 | 8/1991 | Di Franco | 429/224 X |
| 5,108,856 | 4/1992 | Shuster | 429/198 |
| 5,418,089 | 5/1995 | Chaloner-Gill et al. | 429/215 X |

*Primary Examiner*—Anthony Skapars
*Attorney, Agent, or Firm*—Hodgson, Russ, Andrews, Woods & Goodyear LLP

[57] ABSTRACT

A method for preparing an electrode component comprises mixing an electrode active material in a water-based environment with the aid of surfactants. A preferred embodiment of this process comprises combining a high surface area carbonaceous cathode active material with a water/surfactant mixture, and then adding a fluoro-polymer as the binder material to the slurry. The resulting paste is processed and formed into the cathode material. This process replaces the use of isopropyl alcohol with the water/surfactant mixture as the solvent. Preferred surfactants include those of the polyglycol family.

35 Claims, 3 Drawing Sheets

AQUEOUS BLENDED ELECTRODE MATERIAL FOR USE IN ELECTROCHEMICAL CELLS AND METHOD OF MANUFACTURE

BACKGROUND OF THE INVENTION

1. Field of the Invention

The present invention generally relates to the art of electrochemical cells. In particular, the present invention is directed to a method for manufacturing an electrode component for use in an electrochemical cell, and the electrode component so manufactured. More specifically, this invention relates to a process for the manufacture of a cathode component and preferably a carbonaceous cathode component that is formulated in a water-based environment with the aid of a surfactant. Up to now, flammable solvents have been used in such processes to suspend the cathode material and aid in the homogeneous distribution of any added binder material. The present invention eliminates flammable solvents through the use of a water/surfactant combination to wet the cathode and binder materials to form a paste that is easily processible into the desired shape electrode component.

2. Prior Art

The prior art process by which electrode active materials, and particularly carbonaceous materials are formulated for use in electrochemical cells uses a flammable solvent such as isopropyl alcohol. In that manner, suspended in an alcohol-based slurry is thoroughly mixed with a suitable binder material to form a depolarizer admixture paste. In the case of non-carbonaceous electrode active materials, conductive diluents are preferably added to the mix. The alcohol-based solvent serves to suspend the electrode active material in the slurry in addition to aiding in the homogeneous distribution of the binder material throughout the slurry. Alcohol-based solvents have relatively low surface tensions and for that reason are advantageous materials for this application. Particularly, isopropyl alcohol has a surface tension of about 21.7 dynes/cm that enables it to effectively wet the surface area of electrode active materials, especially carbonaceous materials, which have very high surface areas. Pure water, by comparison, has a surface tension of about 72 dynes/cm, and wets the electrode active material very poorly.

Although alcohol-based solvents and particularly isopropyl alcohol perform well as the suspension and dispersion agent in the manufacture of electrodes for use in electrochemical cells, they also have several limitations. Because alcohol-based solvents are flammable, explosion-proof equipment is required in the manufacturing process. In a full scale manufacturing process, quantities of the solvent are large enough that recovery methods must be considered as opposed to losing the material to the atmosphere through evaporation. These factors, as well as the expense of the solvent itself, add significantly to the cost and complexity of the electrode manufacturing process.

SUMMARY OF THE INVENTION

The present invention relates to a new and improved method of preparing an electrode component, and more particularly a cathode component for use in an electrochemical cell. The present method thus comprises combining an electrode active material, and more particularly a cathode active material and still more particularly a carbonaceous material with a water/surfactant mixture. The surfactant concentration must be sufficient to enable the solution to quickly "wet" the electrode active material. A binder material, typically a fluoro-polymeric material such as polytetrafluoroethylene is added to this mix as either a dry powder or an aqueous suspension. The resulting slurry is processed through a high shear mixer to fully disperse and homogenize the various constituents and to fibrillate the binder material throughout the electrode active admixture. Upon removal from the mixer, the electrode active admixture has the consistency of a paste and is further processed to provide the desired shape electrode component.

These and other aspects of the present invention will become increasingly more apparent to those of ordinary skill in the art by reference to the following description taken in conjunction with the accompanying drawings.

DETAILED DESCRIPTION OF THE INVENTION

The present invention comprises taking an already prepared electrode active material and manufacturing an electrode component therefrom. More particularly, the present invention is directed to a cathode component for use in a high energy density electrochemical cell and a process for manufacturing the cathode component from a cathode active material. In that respect, the electrode component is preferably the cathode in a primary electrochemical cell and the anode can comprise an alkali metal such as lithium.

Suitable cathode active materials include a metal, a metal oxide, a mixed metal oxide, a metal sulfide and carbonaceous materials, and mixtures thereof. In the case of a metal oxide and a mixed metal oxide, the cathode active starting material can be made by the chemical addition or reaction or otherwise intimate contact of various metal oxides, mixed metal oxides and/or metal elements during thermal treatment, addition reaction, sol-gel formation, chemical vapor deposition or hydrothermal synthesis in mixed states, as is well known to those skilled in the art. Examples of electrode active materials that may be formed into a cathode component according to the present invention include carbon, fluorinated carbon, silver vanadium oxide, copper silver vanadium oxide, manganese dioxide, cobalt oxide, nickel oxide, copper oxide, iron sulfide, iron disulfide and others, the former two being preferred. Of course, an electrode component made by the process of the present invention can be incorporated into a secondary electrochemical cell, as is well known to those skilled in the art.

Figure 1:
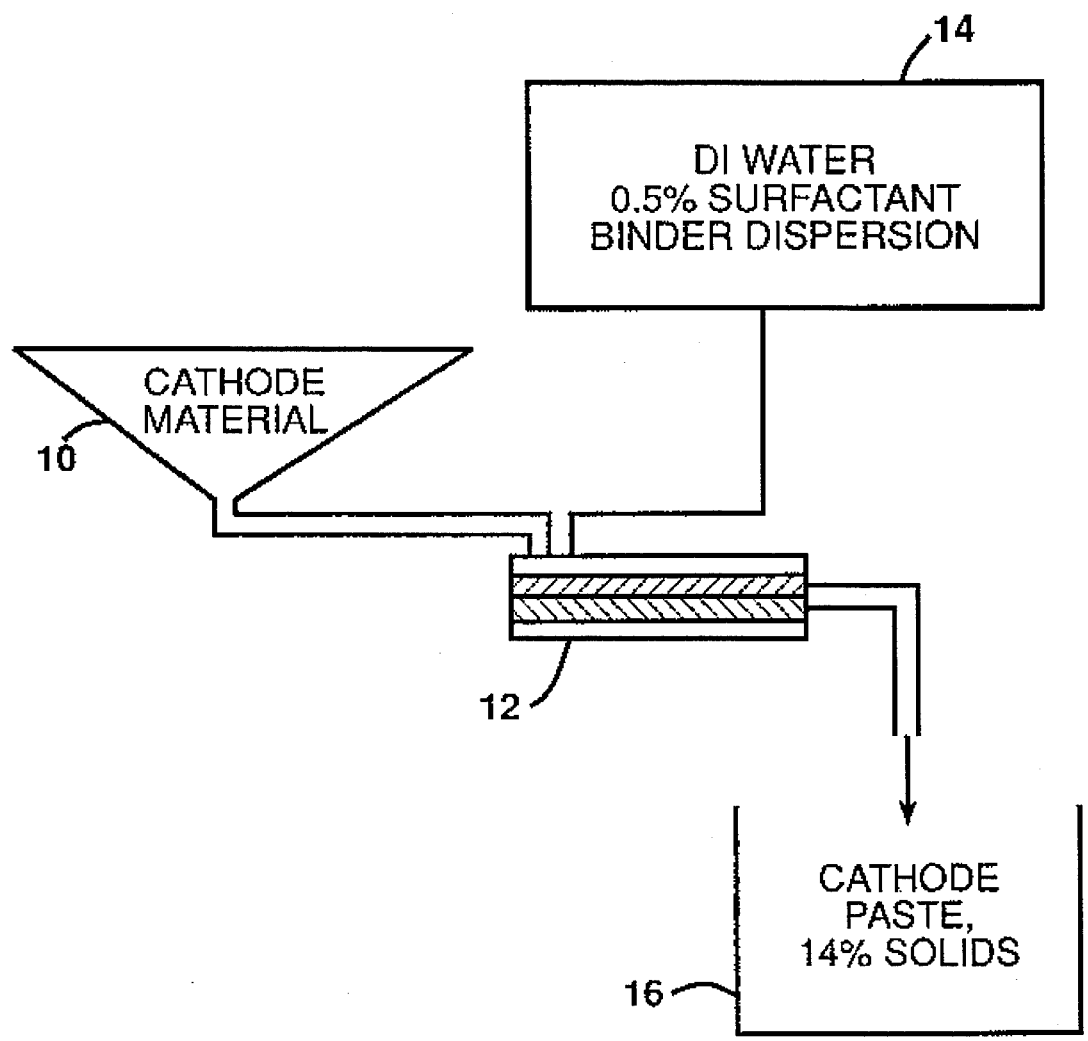
FIG. 1 is a schematic representation of the mixing portion of the method of the present invention.

As illustrated in the schematic representation shown in FIG. 1, the method of the present invention begins with an already prepared dry cathode active material loaded in feeder 10. This material is combined in a twin screw mixer 12 with a dispersion of deionized water, between about 0.1% to 2.0% surfactant, by weight, and a finely-divided thermoplastic polymer binder material, indicated by block 14. Preferably, the surfactant is about 0.5%, by weight, of the dispersion and its inclusion is sufficient to reduce the surface tension of the water to at least about 67 dynes/cm., or less. In the case of the electrode active material comprising a carbonaceous material, the surfactant is selected from the family of polyglycols and preferably comprises a polyoxyethylene-polyoxypropylene block copolymer having a molecular weight of about 8,400.

The thermoplastic polymer binder material is used in its broad sense, and any polymeric binding material which is inert in the cell and which passes through a thermoplastic state, whether or not it finally sets or cures, is included within the term "thermoplastic polymer". Representative materials include polyethylene, polypropylene and fluoropolymers such as fluoronated ethylene propylene and polytetrafluoroethylene, the latter material being most preferred. Natural rubbers are also useful as the binder material with the present invention.

Figure 2:
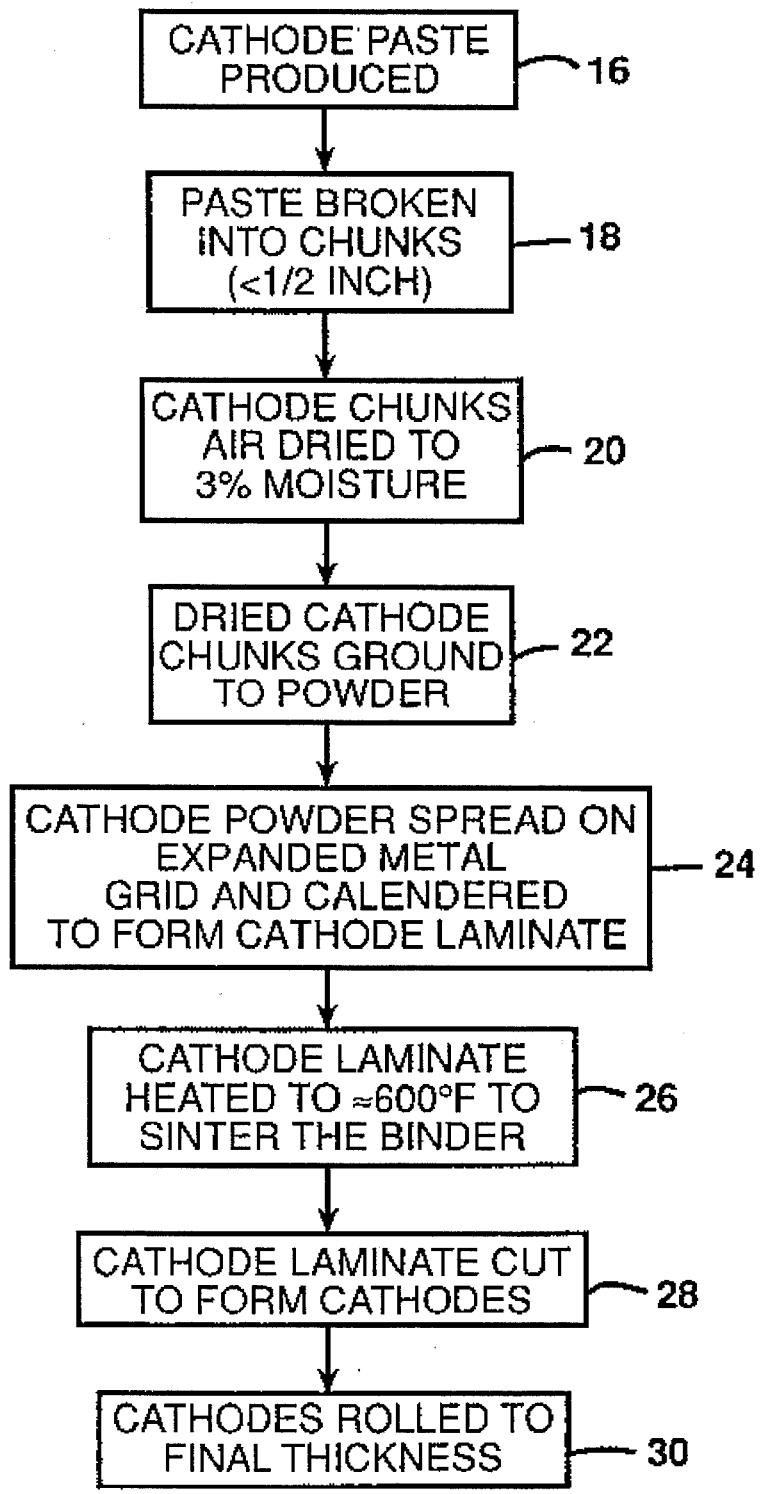
FIG. 2 is a block diagram and flow chart illustrating the steps involved in making a cathode component according to the present invention.

After mixing sufficiently to ensure that the binder material is completely dispersed throughout the admixture and to otherwise completely homogenize the various constituents, the cathode admixture is removed from the mixer 12 as a paste containing about 14% solids, by volume, as indicated by blocks 16 in FIGS. 1 and 2. The step of subjecting the cathode admixture to the mixer 12 to form the paste can also include the addition of a liquid electrolyte.

As illustrated in the block diagram flow chart shown in FIG. 2, following the mixing step, the cathode admixture paste 16 has a dough-like consistency that enables the paste to be broken or chopped into chunks of about one-half inch and less without losing its consistency or firmness, as indicated in block 18. The thusly formed cathode chunks are air dried to remove the majority of the water and surfactant present in the cathode material. Preferably, the drying step is sufficient to obtain a moisture content of about 3%, as indicated by block 20. The dried cathode chunks are subsequently subjected to an attrition or grinding step 22 to comminute their particle size to powder.

Next, the powdered cathode active material is layered onto both sides of an expanded metal screen or grid and this combination is fed into a series of roll mills that calender the cathode active material into thin sheets on the opposed sides of the intermediate grid, as indicated by block 24. The expanded metal grid serves as the cathode current collector in the later assembled electrochemical cell and it is preferably of titanium or aluminum, the latter being most preferred. The calendering step 24 is preferably performed by two to four roll mills that serve to laminate the cathode active material onto the expanded metal grid to provide thin cathode sheets locked together through the openings provided in the intermediate grid. The thusly formed cathode laminate is wound up on a take-up reel after leaving the rollers.

After the powdered cathode active material is calendered during step 24 by the series of roll mills, the thusly formed cathode laminate is heated to a cathode sintering temperature of between about 565° F. to about 615° F. (about 295° C. to about 325° C.), and more preferably about 600° F., as indicated by block 26. This heating step serves to remove any residual water and surfactant from the cathode active material leaving only trace amounts of carbon residue. Heating further serves to plasticize the binder material to ensure the structural integrity of the newly manufactured cathode laminate. The cathode laminate can then be stored for later use, or it is run through a cutting machine, as indicated by block 28, that slits the relatively wide cathode laminate into strip of a size that are useable in an electrochemical cell. A finishing step, indicated at block 30, includes subjecting the cathode strips to a second battery of roll mills that calender the cathode laminate to a final thickness ranging between about 0.004 inches to 0.25 inches for incorporation into a high energy density electrochemical cell, as is well known to those of ordinary skill in the art.

It should be understood that the method of the present invention is particularly useful for manufacturing cathode components wherein the electrode active material predominantly comprises carbonaceous materials. Carbonaceous materials being organic are relatively soft and therefore they are not readily amendable to being punch pressed into a desired shape. Such punch pressing only serves to compact carbonaceous materials into a tightly packed mass having relatively little permeability. In an impermeable tightly packed state, carbonaceous materials are not suitable for intercalation of the metal ions produced by the anode during the electrochemical reaction of the cell. Therefore, in the method of the present invention, it is critically important that the roll mills indicated in steps 24 and 30 calender the carbonaceous cathode active material to an extent sufficient to provide structural integrity and a desired finishing thickness, as the case may be, without compacting the cathode material into a tightly packed mass.

On the other hand, cathode components containing significant amounts of metallic electrode active material, i.e., from between about 80% to 99% by volume are inherently rigid in comparison to carbonaceous materials. As such, metallic materials suitable for use as electrode active materials have sufficient interstitial space between adjacent metallic molecules to provide for intercalation therein, as is well known to those skilled in this art. Being rigid, they are able to withstand considerably higher pressures without losing their ability to intercalate metal ions produced by the anode. In any event, the roll mills used with the method of the present invention are intended to calender the cathode active material under only so much pressure as is needed to provide a laminated sheet of the cathode material without destroying the inherent interstices, regardless of the chemical make-up of the cathode active material.

A cathode component prepared by the method of the present invention can be used, for example, in a nonaqueous electrochemical cell as described in U.S. Pat. No. 4,830,940 to Keister et al., which patent is assigned to the assignee of the present invention and is incorporated herein by reference. The exemplary electrochemical cell can also contain an anode of a metal selected from Group IA of the Periodic Table of Elements, including lithium, sodium, potassium, etc., preferably lithium, and their alloys and intermetallic compounds, for example Li—Si, Li—Al, Li—B and Li—Si—B alloys and intermetallic compounds. The form of the anode may vary, but typically the anode is in the form of a thin sheet or foil of the anode metal, and a current collector having an extended tab or lead affixed to the anode sheet or foil.

The high energy density electrochemical cell also contains a nonaqueous electrolyte which preferably comprises a combination of a lithium salt and an organic solvent, and a separator material that electrically insulates the anode from the cathode with sufficient porosity to allow for electrolyte flow therethrough. Suitable materials for such a separator include non-woven glass, and polytetrafluoroethylene or polypropylene membranes that isolate the active components from each other without impeding the free flow of ions therethrough.

The electrode component made according to the method of the present invention and an electrochemical cell incorporating the same are illustrated further by the following Example, which is presented to enable those skilled in the art to more clearly understand and practice the present invention. However, the following Example should not be considered as a limitation of the scope of the present invention, but it is described as being illustrative and representative thereof.

EXAMPLE I

A cathode component according to the present invention was made by combining high surface area Shawinigan Acetylene Black (SAB) with deionized water, a fibrillatable fluoropolymer namely, DuPont T-30 PTFE and a polyglycol surfactant namely, PLURONIC® F68 produced by BASF to form a 0.5% aqueous solution. The latter surfactant material is a polyoxyethylene-polyoxypropylene block copolymer having a molecular weight of about 8,400. This electrode active admixture was introduced into a Teledyne-Readco 2" twin-screw high shear mixer and the resulting homogeneous paste had a dough-like consistency similar to the electrode active material produced according to the prior art alcohol-based process.

The cathode active paste of the present invention was broken into chunks of about one-half inch and less and these chunks were air dried to obtain a moisture content of about 3%. The thusly processed cathode chunks were next fed to an attrition mill and ground to a powder. The cathode active powder was then calendered onto an expanded metal foil to form a cathode laminate followed by heating to a sintering temperature of about 600° F. (315° C.). This temperature is sufficient to volatilize any remaining surfactant, leaving only trace amounts of carbon residue. Heating further serves to plasticize the fluoropolymer material to increase its binding effect.

The anode was formed from battery grade lithium laminated onto a nickel current collector in a final calendering step to obtain a desired thickness. The finished cathode laminate was then enveloped in two layers of a nonwoven glass fiber to form the cathode component which was associated with the anode in a "jellyroll" configuration and housed in a suitable casing. This electrochemical system was activated with a chlorinated sulfuryl chloride (CSC) catholyte containing a suitable electrolyte salt prepared in-situ with gaseous chlorine added to the catholyte. A plurality of Li/CSC cells incorporating the cathode component collector made according to the present invention were constructed in this matter.

As a comparison, a plurality of Li/CSC control cells were fabricated according to the prior art. These cells differed from the cells made according to the present invention in that the cathode component was made from a paste having isopropyl alcohol as the solvent. The cells fabricated according to the present invention and the cells made according to the prior art process were then discharged to 2 volts at room temperatures under loads of 3 ohms, 10 ohms and 20 ohms, respectively.

Figure 3:
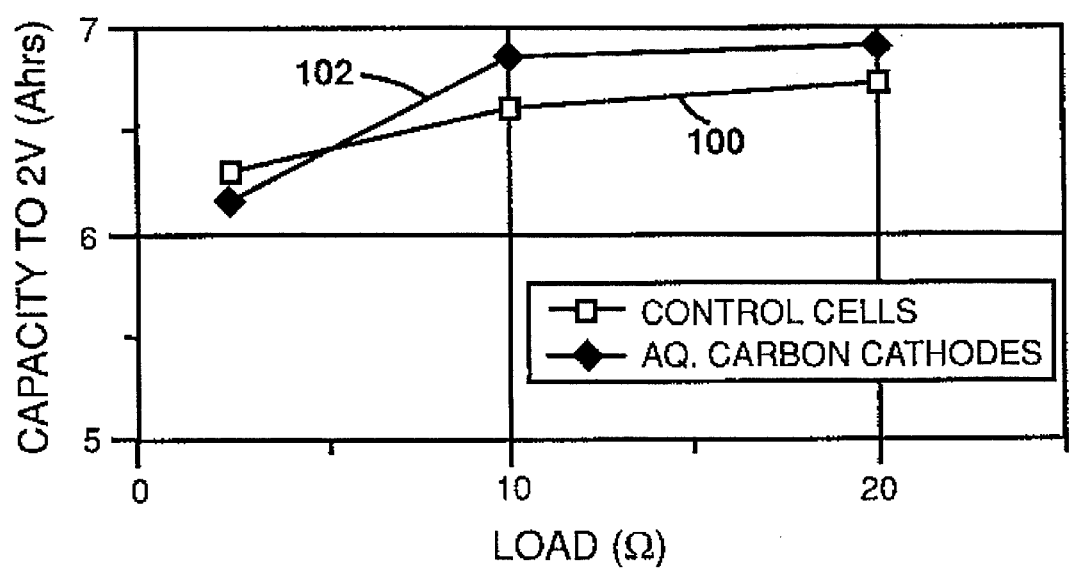
FIG. 3 is a graph showing the discharge curves of electrochemical cells made according to the present invention and made according to the prior art.

FIG. 3 is a graph showing the results of these discharge tests wherein curve 100 was constructed from the prior art cells, i.e. fabricated from the alcohol-based process and curve 102 was constructed from the surfactant-based process of the present invention. The curves clearly show that cell discharge performance is comparable between the two groups. Discharge averages used to construct FIG. 3 are provided in Table 1.

TABLE 1

| Cell Group | Average capacity to a 2 volt cutoff (Ahrs). | | |
| --- | --- | --- | --- |
| | 3Ω | Load 10Ω | 20Ω |
| CSC Controls | 6.30 | 6.60 | 6.78 |
| Aqueous Carbon | 6.23 | 6.83 | 6.91 |

It is intended that the foregoing description and example only be illustrative of the present invention and that the present invention is limited only by the hereinafter appended claims.

What is claimed is:

1. A method of preparing an electrode for use in an electrochemical cell, which comprises:
   a) blending an electrode active material with water, a binder material and a polyglycol surfactant characterized in that the polyglycol surfactant reduces the surface tension of the water to wet the electrode active material and to wet the binder material;
   b) subjecting the blend to a mixing process to form an electrode active paste;
   c) removing the surfactant and the water from the electrode active paste to provide a homogeneous electrode active admixture having trace amounts of carbon left behind by the surfactant; and
   d) forming the electrode active admixture into the desired shaped electrode.

2. The method of claim 1 wherein the surfactant is polyoxyethylene-polyoxypropylene block copolymer.

3. The method of claim 1 wherein the surfactant reduces the surface tension of the water to at least about 67 dynes/cm, or less.

4. The method of claim 1 wherein the surfactant is present in the blend in an amount of between about 0.1% to about 2.0%, by weight.

5. The method of claim 1 wherein the electrode active material is selected from the group consisting of a metal, a metal oxide, a mixed metal oxide, a metal sulfide and a carbonaceous material, and mixtures thereof.

6. The method of claim 1 wherein the binder material is a fibrillatable fluoropolymer.

7. A method of preparing a cathode for use in an electrochemical cell, which comprises:
   a) blending a cathode active material with water, a binder material and a polyglycol surfactant characterized in that the polyglycol surfactant reduces the surface tension of the water to wet the cathode active material and to wet the binder material;
   b) subjecting the blend to a mixing process to form a cathode active paste;
   c) removing the surfactant and water from the cathode active paste to provide a homogeneous cathode active admixture having trace amounts of carbon left behind by the surfactant; and
   d) calendaring the homogeneous cathode active admixture onto at least one side of a current collector means as a cathode laminate.

8. The method of claim 7 including the step of comminuting the homogeneous cathode active admixture into a powder form, which power is subsequently subjected to the calendaring step.

9. The method of claim 7 wherein the calendaring step layers the homogeneous cathode active admixture powder laminated onto both sides of the intermediate current collector means.

10. The method of claim 7 including sintering the cathode laminate to remove any residual water and surfactant from the cathode active admixture and to plasticize the binder material.

11. The method of claim 10 wherein the sintering step is carried out at a temperature range of between about 565° F. to about 615° F. (about 295° C. to about 325° C.).

12. The method of claim 7 wherein the surfactant is polyoxyethylene-polyoxypropylene block copolymer.

13. The method of claim 7 wherein the surfactant reduces the surface tension of the water to at least about 67 dynes/cm, or less.

14. The method of claim 7 wherein the surfactant is present in the blend in an amount of between about 0.1% to about 2.0% by weight.

15. The method of claim 7 wherein the cathode active material is selected from the group consisting of a metal, a metal oxide, a mixed metal oxide, a metal sulfide and a carbonaceous material, and mixtures thereof.

16. The method of claim 7 wherein the cathode active material is selected from the group consisting of silver vanadium oxide, copper silver vanadium oxide, manganese dioxide, cobalt oxide, nickel oxide, copper oxide, iron sulfide, iron disulfide, copper vanadium oxide, carbon and fluorinated carbon, and mixtures thereof.

17. The method of claim 7 wherein the binder material is a fibrillatable fluoropolymer.

18. The method of claim 7 wherein the steps of subjecting the blend to the mixing process to form the paste includes the addition of a liquid electrolyte.

19. The method of claim 9 wherein the cathode laminate has a thickness in the range of from between about 0.004 inches to about 0.25 inches.

20. An electrode component for use in an electrochemical cell, the electrode component comprising an electrode active material blended with water, a binder material and a polyglycol surfactant characterized in that the polyglycol surfactant reduces the surface tension of the water to wet the electrode active material and to wet the binder material, wherein the blend is subjectable to a mixing means that serves to provide a paste comprising the electrode active material and wherein a homogeneous electrode active admixture provided from the electrode active paste having had the surfactant and water removed therefrom is subjectable to a forming means to provide the electrode component having a desired shape.

21. The electrode component of claim 20 wherein the surfactant is present in the blend in an amount of between about 0.1% to about 2.0%, by weight.

22. The electrode component of claim 20 wherein the surfactant reduces the surface tension of the water to at least about 67 dynes/cm, or less.

23. The electrode component of claim 20 wherein the electrode active material is selected from the group consisting of metal, a metal oxide, a mixed metal oxide, a metal sulfide and a carbonaceous material, a mixtures thereof.

24. The electrode component of claim 20 wherein the electrode component is a cathode component and the active material is selected from the group consisting of silver vanadium oxide, copper silver vanadium oxide, manganese dioxide, cobalt oxide, nickel oxide, copper oxide, iron sulfide, iron disulfide, copper vanadium oxide, carbon and fluorinated carbon, and mixtures thereof.

25. The electrode component of claim 20 wherein the electrode component is a laminate comprising the electrode active admixture associated with a current collector means, the laminate having a thickness in the range of from between about 0.004 inches to about 0.25 inches.

26. A nonaqueous electrochemical cell having an electrode component made by the method of claim 1.

27. A nonaqueous electrochemical cell having a cathode component made by the method of claim 7.

28. An electrode component made by the method of claim 1.

29. A cathode component made by the method of claim 7.

30. The method of claim 1 wherein the step of removing the surfactant and water from the electrode active paste reduces the moisture content to about 3%.

31. The method of claim 1 wherein the step of forming the electrode active admixture into the desired shaped electrode includes heating the electrode active admixture to remove any residual water and surfactant therefrom.

32. The method of claim 31 wherein the heating step is carried out at a temperature range of between about 565° F. to about 615° F. (about 295° C. to about 325° C.).

33. The electrode component of claim 20 wherein the homogenous electrode active admixture having had the surfactant and water removed therefrom has a moisture content of about 3%.

34. The electrode component of claim 20 wherein the formed electrode component is characterized as having been heated to remove any residual water and surfactant therefrom.

35. The electrode component claim 34 wherein the electrode component is characterized as having been heated at a temperature range of between about 565° F. to about 615° F. (about 295° C. to about 325° C.).

* * * * *